US008799932B2

(12) United States Patent
Prevost

(10) Patent No.: US 8,799,932 B2
(45) Date of Patent: Aug. 5, 2014

(54) SYSTEM AND METHOD FOR SUPPORT OF LEGACY COMMUNICATIONS PROTOCOLS IN A SMART CARD

(75) Inventor: Sylvain Prevost, Austin, TX (US)

(73) Assignee: Gemalto SA, Meudon (FR)

( * ) Notice: Subject to any disclaimer, the term of this patent is extended or adjusted under 35 U.S.C. 154(b) by 1349 days.

(21) Appl. No.: 11/996,265

(22) PCT Filed: Jul. 21, 2006

(86) PCT No.: PCT/IB2006/002010
§ 371 (c)(1),
(2), (4) Date: Jan. 18, 2008

(87) PCT Pub. No.: WO2007/010380
PCT Pub. Date: Jan. 25, 2007

(65) Prior Publication Data
US 2008/0222665 A1    Sep. 11, 2008

Related U.S. Application Data

(63) Continuation of application No. 11/188,065, filed on Jul. 22, 2005, now abandoned, and a continuation of application No. 11/199,690, filed on Aug. 9, 2005, now abandoned.

(51) Int. Cl.
*G06F 9/54* (2006.01)
(52) U.S. Cl.
USPC ........................................................ 719/330
(58) Field of Classification Search
None
See application file for complete search history.

(56) References Cited

U.S. PATENT DOCUMENTS

| | | | |
|---|---|---|---|
| 6,253,370 B1* | 6/2001 | Abadi et al. | 717/154 |
| 6,611,817 B1 | 8/2003 | Dorrance et al. | |
| 7,155,705 B1* | 12/2006 | Hershberg et al. | 717/137 |
| 2002/0082847 A1* | 6/2002 | Vandewalle et al. | 705/1 |
| 2002/0083142 A1* | 6/2002 | Lagosanto et al. | 709/207 |
| 2004/0143641 A1* | 7/2004 | de Jong | 709/213 |
| 2004/0143814 A1* | 7/2004 | de Jong | 717/104 |
| 2006/0179146 A1* | 8/2006 | Marucheck et al. | 709/227 |
| 2006/0266843 A1* | 11/2006 | Flattin et al. | 235/492 |

FOREIGN PATENT DOCUMENTS

WO        01/24475      4/2001

OTHER PUBLICATIONS

Erik Poll, Formal Specification of the JavaCard API in JML: the APDU class, Oct. 27, 2000, pp. 1, 4 and 10-15.*
Zhiqun Chen, Java Card Technology for Smart Cards, Feb. 2004, Addison-Wesley, pp. 85-91.*
C. Enrique Ortiz, An introduction to Java Card Technology—Part 2, The Java Card Applet, Sep. 2003, Pages All.*
Martijn Warnier, Java Card Remote Method Invocation, Nov. 10, 2003, Pages All.*

(Continued)

*Primary Examiner* — H S Sough
*Assistant Examiner* — Syed Roni
(74) *Attorney, Agent, or Firm* — The Jansson Firm; Pehr B. Jansson

(57) ABSTRACT

In general, the invention relates to a converter. The converter includes logic for reading annotations in a source program, where the annotations provide a mapping between method names for methods invoked using messages in a legacy protocol and a native protocol. The converter further includes logic for creating a mapping data structure using the annotations to provide a mapping between method invoking instructions in the legacy protocol and method invoking instructions in the native protocol.

7 Claims, 10 Drawing Sheets

(56) References Cited

OTHER PUBLICATIONS

Written Opinion of the International Searching Authority (5 pages), Oct. 18, 2006.

International Search Report for PCT/IB2006/002010 mailed Oct. 18, 2006 (2 pages) Mail Room Date: Jan. 18, 2008.

* cited by examiner

SYSTEM AND METHOD FOR SUPPORT OF LEGACY COMMUNICATIONS PROTOCOLS IN A SMART CARD

TECHNICAL FIELD

The present invention relates generally to remote access of methods on a smart card, and more particularly to the support of a legacy communications model for remote access of methods on a smart card.

BACKGROUND OF THE INVENTION

Smart cards are small personal computing devices that are used to protect very sensitive information. Smart cards may be used to perform banking functions, provide access to health records, personalization of computer network access, secure building access, and many more functions. Smart cards are also used as subscriber identity modules (SIM) in certain mobile telephony networks.

Though they are small computers, smart cards lack input and output devices as well as power supply. Therefore, access to data and programs stored in a smart card has to be obtained through another computer to which the smart card is connected. Typically a smart card is inserted into a smart card reader attached to a host computer for input and output functions as well as power.

In such a connection scheme, the smart card and host computer operate according to a server-client model in which client programs execute on the host computer and server programs execute on the smart card. The host computer client programs call upon the smart card server programs to provide some data or other functionality provided by the smart card.

Hitherto, the dominant standard for smart cards has been the ISO-7816 standard. According to the ISO-7816 standard, communication between smart cards and host computers use a communication packet called an APDU (Application Program Data Unit When the APDU format was designed, smart cards were very small and had very limited computing power. Therefore, the APDU format was geared towards efficient and compact communication suitable for very small and not very powerful processors.

Recent times have seen much improvement in the way that computers communicate with one another. One such advance is the Remote Procedure Call (RPC) mechanism. With the RPC mechanism, it is possible to have object-oriented communications between programs running on distinct and separate nodes in a computer network. It would be desirable to use the RPC mechanism on smart cards thereby providing the increase in functionality available through the RPC mechanisms. With the increase in power of smart card processors and communications channels between smart cards and host computers, it would be possible for smart cards to use the RPC mechanism.

However, communication between two nodes on a network requires that both nodes communicate using the same protocol. Thus, smart cards that communicate using APDU communicate with terminals and hosts that use APDU. Similarly, smart cards implemented to communicate using RPC communicate with terminals and hosts that use RPC. With the large installed base of terminals that communicate using the APDU protocol, it continues to be desirable for next generation smart cards, including those that may support the RPC mechanism, to support the APDU protocol.

From the foregoing it will be apparent that there is still a need for an improved method to provide smart card-to-host communication that supports remote procedure (RPC) calls while overcoming the foresaid requirement that the host computer support the RPC protocol. More generally, it will be apparent that there is a need to support an evolution in communications protocols on smart cards while allowing support for legacy protocols.

DETAILED DESCRIPTION OF THE INVENTION

Figure 1:
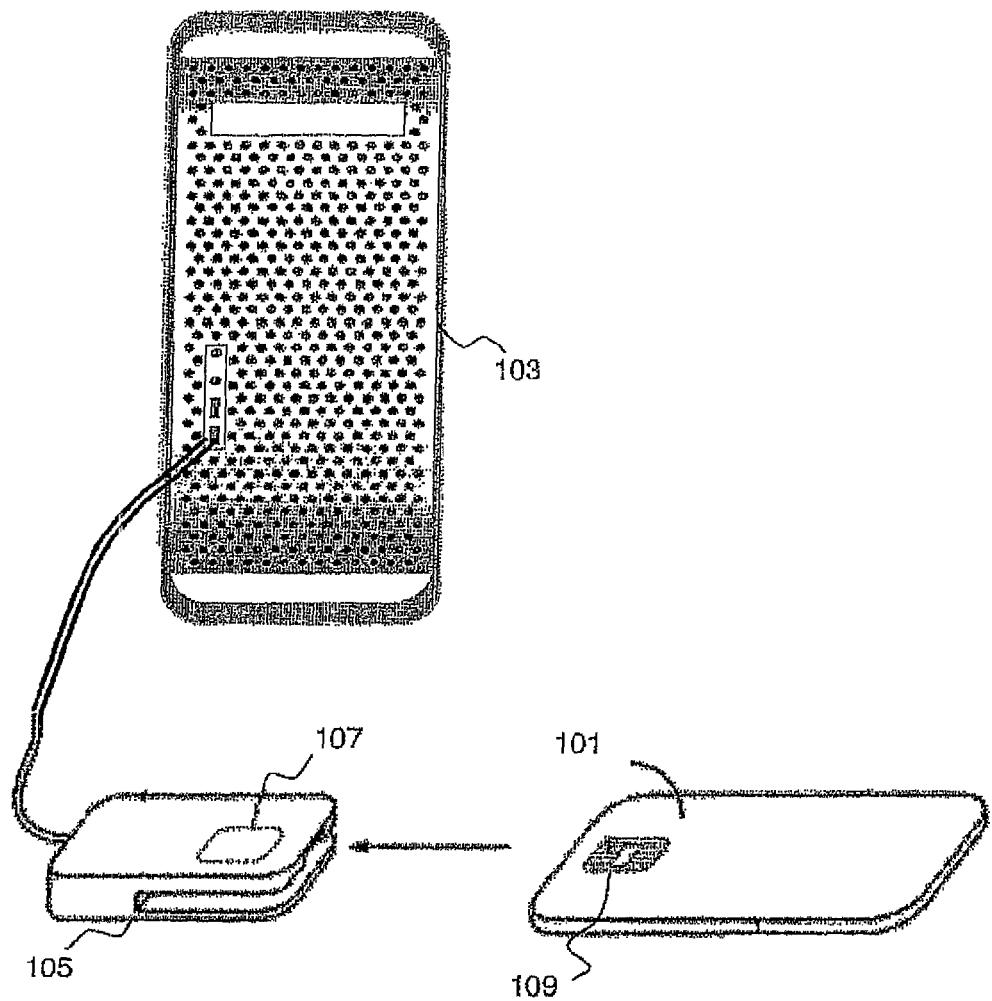
FIG. 1 is a schematic illustration of an example of an operating environment for a smart card, in particular illustrating an example in which a smart card is connected to a host computer by being inserted into a terminal.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As shown in the drawings for purposes of illustration, the invention is embodied in a system and method for providing support for legacy communications protocols in a smart card system that support a modern communications protocol. In a specific preferred embodiment, the invention is embodied in a system and method for providing support for the APDU protocol in a smart card system that uses the RPC communications model as its native communications model.

INTRODUCTION

FIG. 1 is a schematic illustration of an example of an operating environment for a smart card, in particular illustrating an example in which a smart card 101 is connected to a host computer 103 by being inserted into a terminal 105. The terminal 105 has a communications connector 107 that may be placed in electrical contact with a corresponding communications connector 109 on the smart card 101. Alternatively, the terminal 105 and the smart card 101 may communicate in a contactless fashion.

FIG. 1 only shows the visible components of the smart card 101, in particular the contact pad 109. A smart card 101 also contains several hidden components, notably a processor that is electrically connected to the contact pad 109.

Figure 2:
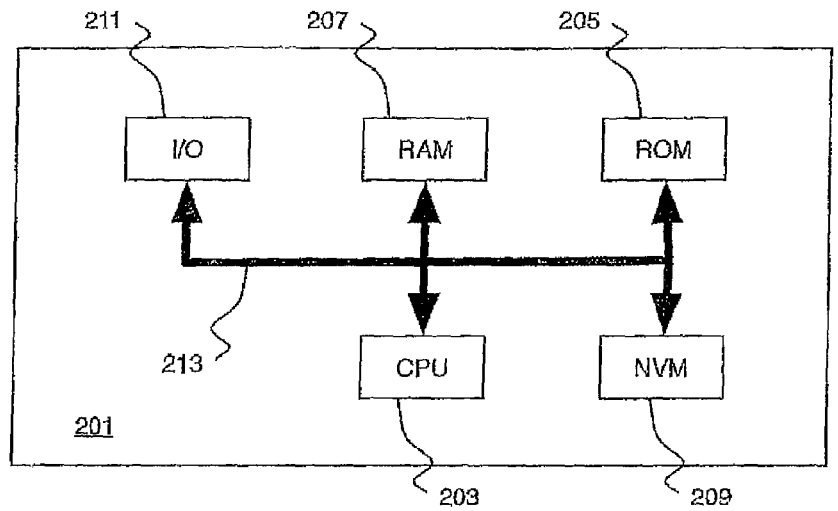
FIG. 2 is a schematic illustration of an exemplary architecture of a smart card processor.

FIG. 2 is a schematic illustration of an exemplary architecture of a smart card processor 201. The smart card processor 201 has a central processing unit 203, a read-only memory (ROM) 205, a random access memory (RAM) 207, a non-volatile memory (NVM) 209, and a communications interface 211 for receiving input and placing output to a device, e.g., the terminal 105 and the host computer 103, to which the smart card processor 201 is connected. These various components are connected to one another, for example, by bus 213. In one embodiment of the invention, the on-card software used to implement the methods described herein may be stored on the smart card 203 in the ROM 205. During operation, the CPU 203 operates according to instructions in the various software modules stored in the ROM 205.

Figure 3:
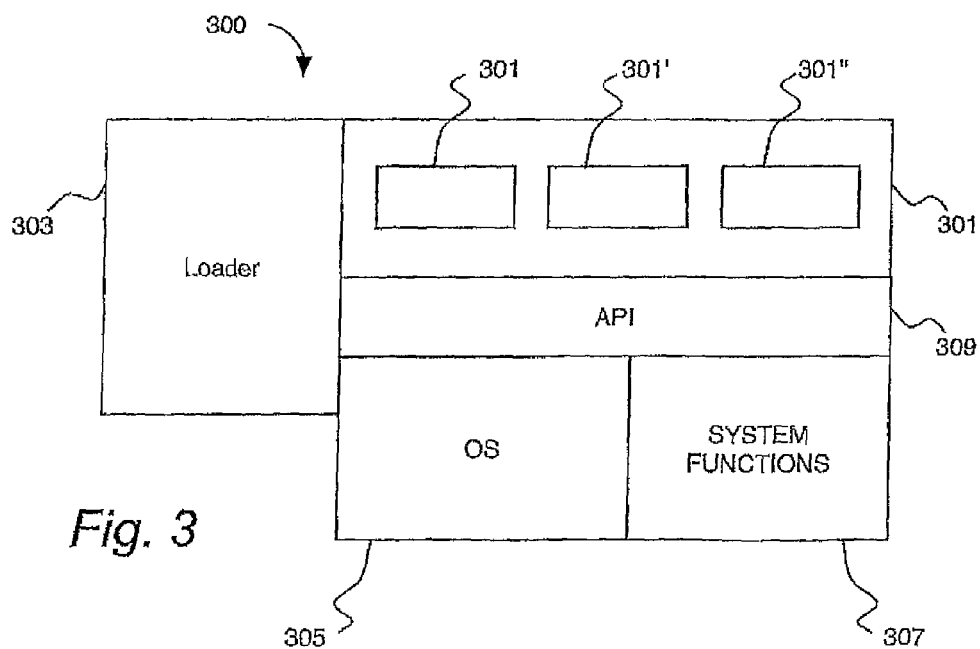
FIG. 3 is a block diagram of an exemplary software architecture that one may find implemented on a smart card.

FIG. 3 is a block diagram of an exemplary software architecture 300 that one may find implemented on a smart card 101. The software architecture 300 includes several application programs 301, e.g., application programs 301, 301', and 301". These are loaded onto the smart card by a loader 303. The application programs 301 would typically be loaded into the non-volatile memory 209. However, in other scenarios an application program may be permanently written onto the smart card at manufacture by having it stored in the ROM 205.

In one embodiment, the application programs 301 are compiled into executable code. The job control is managed by an operating system program 305.

Figure 4:
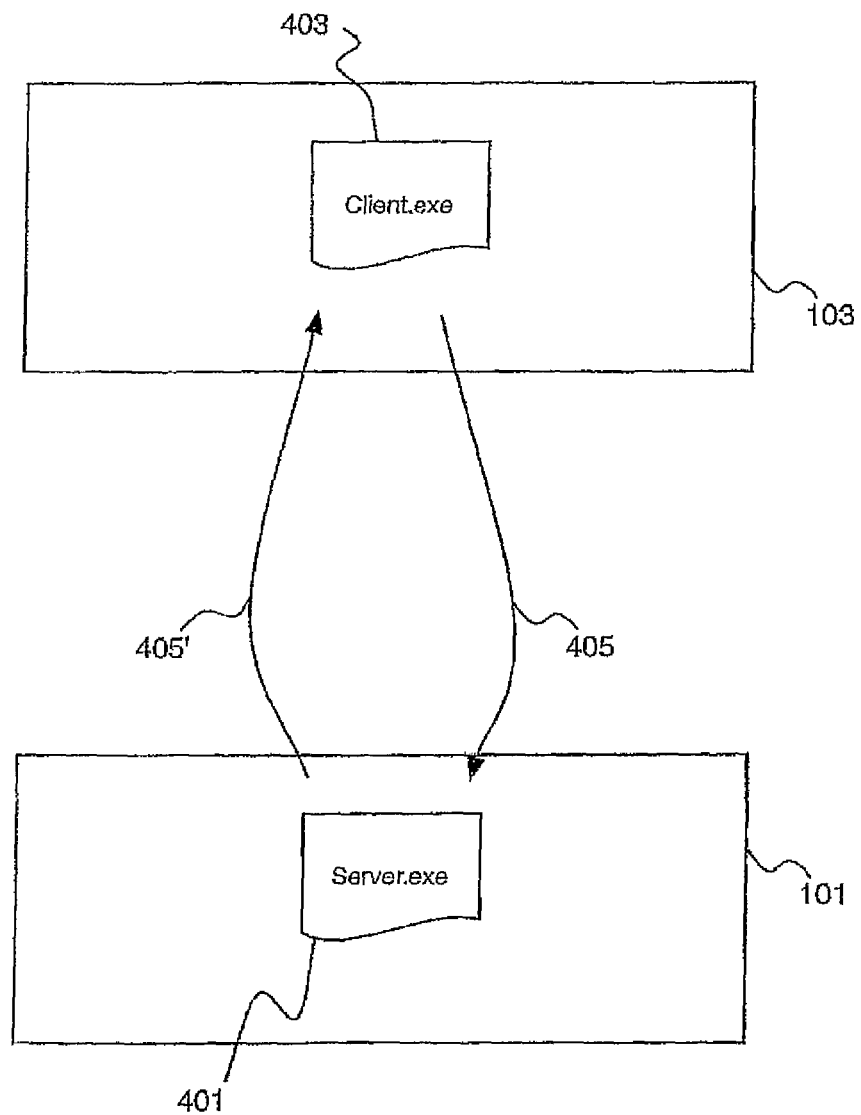
FIG. 4 is a block diagram illustrating message flow between a client program executing on the host computer and a server program executing on a smart card.

FIG. 4 is a block diagram illustrating message flow between a client program 403 executing on the host computer 103 and a server program 401 executing on a smart card 101. The client program 403 may issue a message 405 on an object, function or other data structure of the server program 401. The server program 401, in turn, may respond by sending a message 405 back to the client program 403. According to the invention, the message traffic between the server program 401 and the client program 403 may be either in a native communications protocol or in a legacy protocol. If the messages are transmitted using the legacy protocol, a communications module on the smart card transforms the incoming messages into a native protocol prior to dispatching the message to the server program 401. This transformation is discussed in greater detail herein below.

Figure 5:
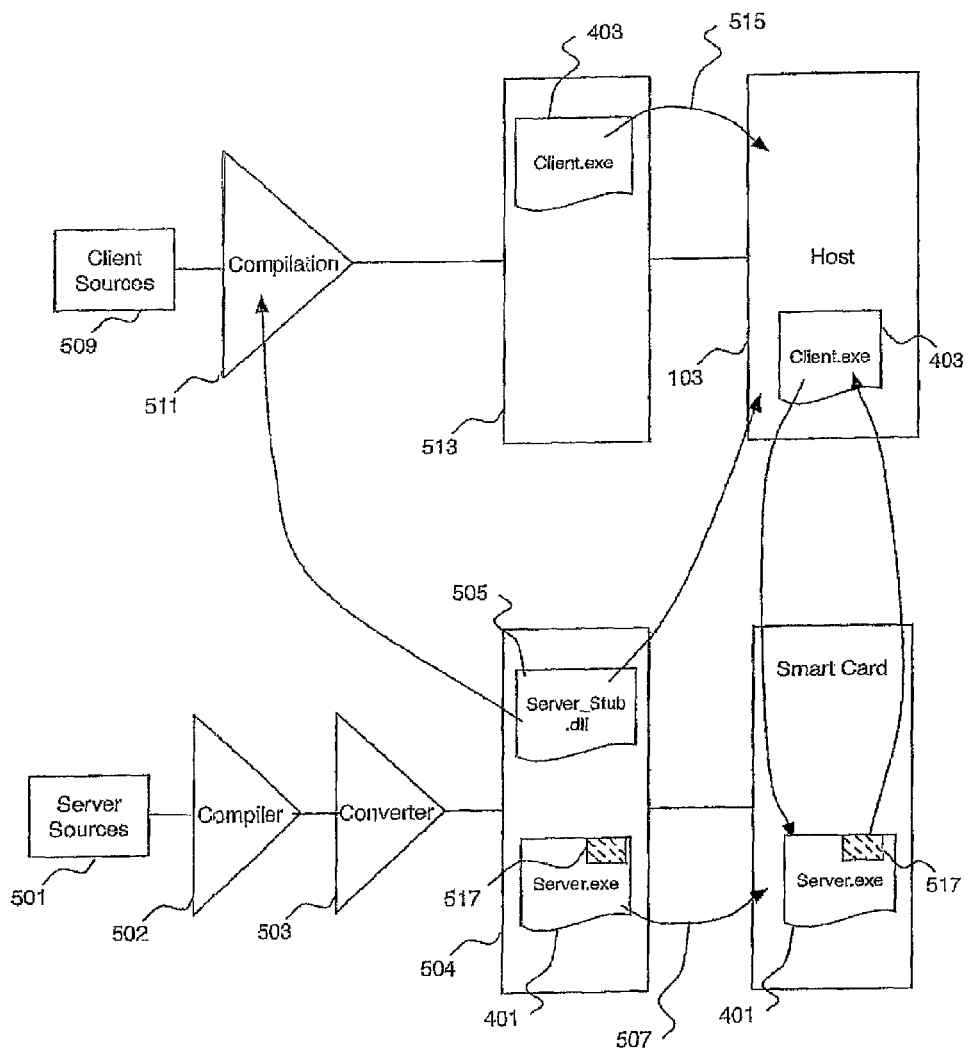
FIG. 5 is a block diagram illustrating the development cycle of the client program and the server program.

FIG. 5 is a block diagram illustrating the development cycle of the client program 403 and the server program 401. Typically, modern application programs for smart cards are developed using special, versions of high-level languages, e.g., Java or the programming languages supported by .Net from Microsoft Corporation. The smart card versions of these programming languages are generally subsets of the full-fledged versions used to program conventional computers. Because the smart card versions are proper subsets of the full-languages, generally programs developed for smart cards using the high-level languages are compiled as conventional programs using a standard compiler 502 designed for that language. However, to ensure that the smart card programs execute correctly on a smart card, the programs also undergo a conversion step performed by a converter 503. Thus, the server program 401 is first written in a high-level language as one or more high-level language source files 501. These source files 501 are compiled and converted using a compiler 502 and converter 503, respectively. The compiler 502 and converter 503 produce the executable image of the server program 401 and a server stub file 505, e.g., a .dll. The compilation and conversion steps typically occur on a development computer 504 for subsequent distribution and loading onto smart cards. However, in alternative embodiments the converter resides on the smart card and the conversion step is performed on the smart card. Finally, the server program 401 is loaded onto the smart card 101, step 507. The loader program 303 may perform the loading step 507.

The client program 403 development path is similar. However, because the client program 403 does not execute on the smart card 101, the client program 403 does not under go a conversion step. The client program 403, like the server program 401, is written in a high-level language into one or more client source files 509. These source files 509 are compiled using a high-level language compiler 511. In the contemplated scenario, the server program 403 calls upon functionality in the server program 401. To be able to do that, the client source files 509 are compiled against the server program 401 using the server stub file 505. The compiler produces the executable file of the client program 403. The compilation process may occur on a development machine 513 for subsequent installation, step 515, onto the host computer 103.

As discussed in conjunction with FIG. 4, communication between the client program 403 and the server program 401 may be either in a native communications protocol or using a legacy communications protocol. The development, compilation and conversion process according to the invention make the alternative of communicating in a legacy protocol possible. The details of the development, compilation, and conversion process that enable the use of legacy communication protocols are described herein below. However, first we describe some of the mechanics of client-to-server communication between a host 103 and a smart card 101.

In one embodiment of the invention, the client and server programs are both developed using the .Net programming system (ECMA 335 standard). Furthermore, the smart card 101 is a smart card developed to support programs developed using the .Net system. Such smart cards may be referred to as ".Net cards".

Communications from the client-host program 403 to the on-card server 401 requires that the client program 403 has been compiled against an interface for the server program 401. The interface, which is found in the server stub file 505, is created using public methods prototypes of the .Net system and extend to the server class System.MarshalByRefObject.

Table I is a code snippet of an exemplary Server class (which may be compiled into the server program 401.

TABLE 1

Server Code Example public class Server : MarshalByRefObject
{
    public void method1( )

TABLE 1-continued

Server Code Example

```
    {
        ...
    }
    public byte[ ] method2(int input)
    {
        ...
    }
    private int method3( )
    {
        ...
    }
}
```

In this example, while it contains three methods (method1, method2, and method3), only method1 and method2 (the two public methods) would be present in the interface.

Table 2 is a code example illustrating how a client program 401 may invoke these methods:

TABLE 2

Example client code invoking methods of a server program.

```
public class Client
{
    public static Main( )
    {
        ...
        // invoke method1
        remoteServerReference.method1( );
        // invoke method2
        byte[ ] result =
            remoteServerReference.method2(value);
    }
}
```

Prior to invoking a method upon an object, one must create an instance of this object. An instance represents the set of data on which the code logic must be applied. The following code is an example:

```
MyCode   myMotherCodeInstance   =   new MyCode("myMotherName");
MyCode   myFatherCodeInstance   =   new MyCode("myFatherName");
```

MyMotherCodeInstance and MyFatherCodeInstance are two instances of the same code, and represent two different sets of data (one contains "myMotherName" and the other one contains "myFatherName") on which the code logic defined by the "MyCode" type will apply.

When talking about client and server, one makes the assumption that client and server are instances of a client code and server code. Thus, in the diagram of FIG. 4, the client program 403 is more accurately an instance of the client code and the server program 401 is more accurately an instance of the server program.

The example of Table 2 becomes:

TABLE 3

Client class which creates new instance of the server

```
public class Client
{
    public static Main( )
    {
        Server remoteServerReference = new Server( );
```

TABLE 3-continued

Client class which creates new instance of the server

```
        // invoke method1
        remoteServerReference.method1( );
        // invoke method2
        byte[ ] result =
            remoteServerReference.method2(value);
    }
}
```

To give a client instance access to a particular server instance, a unique name is associated with each server instance. The server instance name is also called a URI (Uniform Resource Identifier). A URL (Uniform Resource Locator) describes fully the location of an instance on a particular computer (or other node). A server URL contains the URI for the server instance. For example, in the URL http://123.456.789.455/folder1/TheServerOfMyFather the server instance name, i.e., the URI is TheServerOfMyFather and http://123.456.789/folder1 describes the location of that instance, i.e., it is the universal address of the instance.

Usually, dedicated APIs allow to access server instance remotely by providing a URL, as illustrated in Table 4.

TABLE 4

Client Class invoking methods of a Server Instance

```
public class Client
{
    public static Main( )
    {
        Server remoteServerReference =
            Activator.GetObject(typeof(Server),
        "http://123.456.789.455/folder1/TheServerOfMyFather");
        // invoke method1
        remoteServerReference.method1( );
        // invoke method2
        byte[ ] result =
            remoteServerReference.method2(value);
        ...
    }
}
```

The same code for a .Net smart card communicating using the ISO-7816 APDU protocol is illustrated in Table 5.

TABLE 5

Client Class invoking methods of a server instance specified as an APDU.

```
public class Client
{
    public static Main( )
    {
        Server remoteServerReference =
            Activator.GetObject(typeof(Server),
        "apdu://SmartCardReaderName/TheServerOfMyFather");
        // invoke method1
        remoteServerReference.method1( );
        // invoke method2
        byte[ ] result =
            remoteServerReference.method2(value);
        ...
    }
}
```

When a server instance is registered onto the smart card, the server instance name is linked to a class.

According to the invention, the communication between the client and the server may be either in the native communications protocol supported by the smart card or in a legacy protocol. The mechanism that supports such support of legacy protocol communication relies on certain transformations performed in-part by the converter 503 and in-part by on-card logic supporting the legacy protocol. One aspect of the mechanism to support legacy protocol is a mapping table 517 produced by the converter 503. The structure, generation and use of the mapping table 517 are described herein below.

In one embodiment of the invention, the native communications protocol is the Remote Procedure Call (RPC) communications protocol. The legacy protocol supported by that embodiment of the invention is the ISO-7816 APDU protocol. ISO-7816 APDU are described in ISO7816-3 & ISO7816-4 specifications, the entire disclosure of which is incorporated herein by reference.

Figure 6:
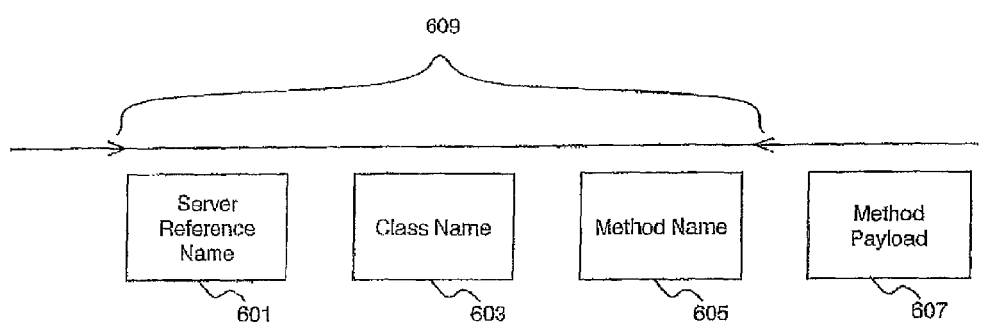
FIG. 6 is a schematic illustration of the structure of an RPC method invocation.

FIG. 6 is a schematic illustration of the structure of an RPC method invocation according to the invention. An RPC method invocation consists of four components: a Server Reference Name 601, a Class Name 603, a Method Name 605, and a Method Payload 607. The first three of these form a Header 609.

For example, when invoking a method called RemoteServerReference.method1( ) on the server instance "TheServerOfMyFather" the RPC call fields would be:

Server Reference Name="TheServerOfMyFather"
Class Name="Server"
Method Name="method1"
Method Payload=empty A given Server Reference Name (also called Instance Name) may not be card unique. Hence Class Name is used to uniquely identify the instance named "TheServerOfMyFather" whose underlying code logic is the "Server" class.

Figure 7:
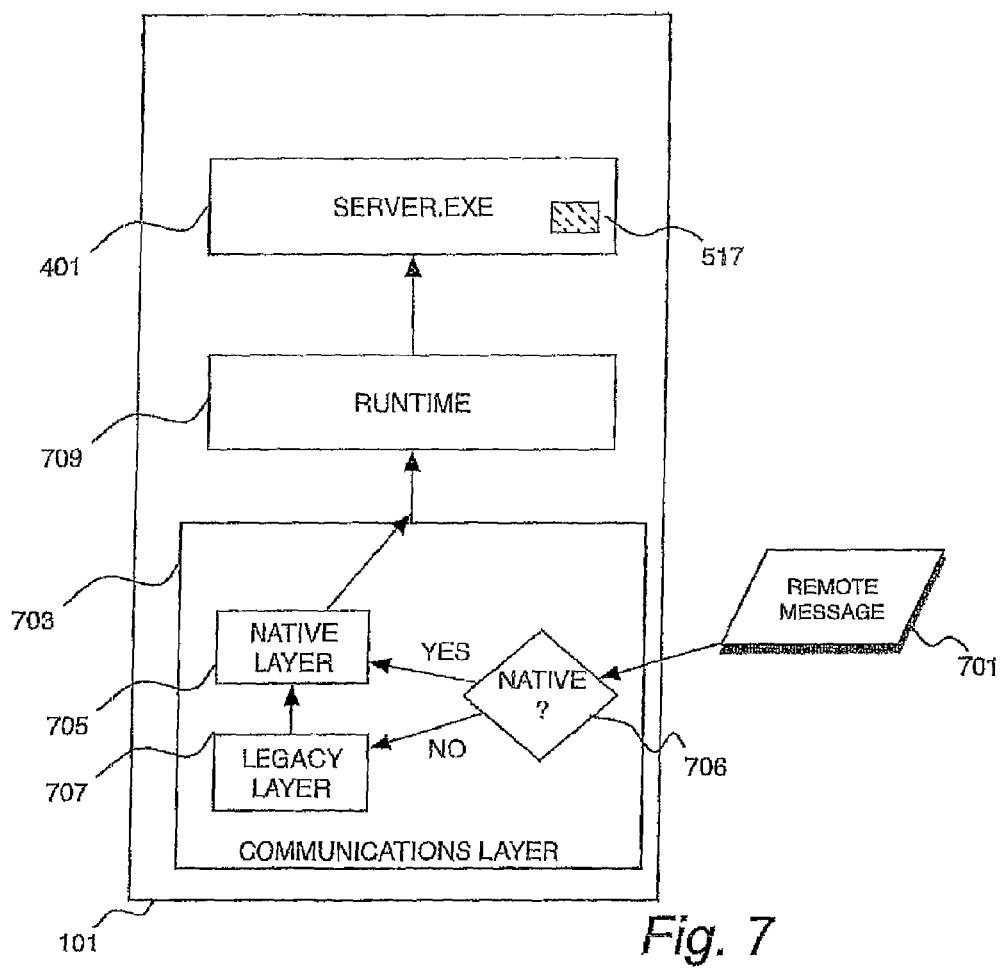
FIG. 7 is a flow-chart illustrating the processing, according to the invention, of an incoming remote message from a client program to be processed by the smart card.

FIG. 7 is a flow-chart illustrating the processing of an incoming remote message 701 from a client program 403 to be processed by the smart card 101. The details of the processing of a remote message are discussed in greater detail herein below. However, at this stage of the discussion it should be noted that a communications layer 703, which is implemented as a systems function of the smart card 101 and stored in memory of the smart card processor 201, e.g., in the ROM 205 or the NVM 209, transforms the remote message 701 from a legacy protocol format to a native protocol format.

Figure 8:
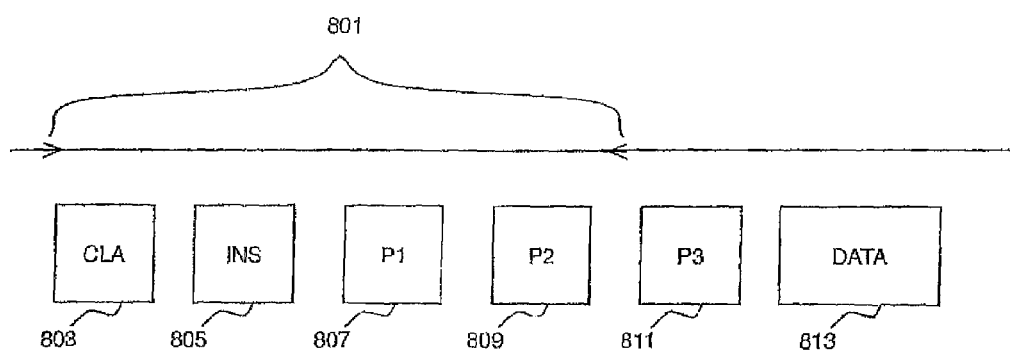
FIG. 8 is a block diagram illustrating the structure of an APDU message.

In one embodiment of the invention, the legacy protocol supported by the smart card 101 is the ISO-7816 APDU protocol. FIG. 8 is a block diagram illustrating the structure of an APDU message. The APDU protocol consists of a four byte header 801 having the fields CIA 803, INS 805, P1 807 and P2 809, a 1 byte payload length field P3 811, and a variable length payload field DATA 813.

To initiate communications with an on-card application, e.g., in our example, the server program 401, the client program 403 would initiate communication using the Select APDU command. The Select APDU command directs the card to internally activate an instance, and to direct all subsequent APDU commands to the code associated with that instance.

For example, the client program 403 may issue the commands:

TABLE 6

Code for selecting an instance using the Select APDU header and code for invoking a function.

1/ Select instance named A00000000003:
00A4040007A00000000003
select APDU header: 00A40400
instance name: A00000000003

TABLE 6-continued

Code for selecting an instance using the Select APDU header and code for invoking a function.

P3: payload length = 07
2/ debit operation of amount 0x54477
A08012340400054477
Debit APDU header: A0801234
Debit payload: 00054477
P3: payload length = 04

In message 1, the APDU header 00A40400 is the instruction corresponding to the Select APDU command. The CLA is 00, the INS is A4, the first parameter (P1) is 04 and the second parameter (P2) is 00. In this example, the client program includes a debit function to perform a debit operation on the selected instance. The debit operation header CLA is A0, the INS is 80, the P1 is 12, and the P2 is 34.

Having received the Select APDU command, the card activates the A00000000003 instance (it could be linked to a particular account for example), and the card also becomes aware of the code that is associated with the instance name, e.g., the debit operation. Unlike in RPC mode, to a given instance name, a unique code logic can be associated. Therefore, the instance name must be a card unique feature.

To allow the communications layer 703 to transform the APDU protocol message into an RPC message that is native to the smart card 101, a mapping table between RPC method names and APDU headers is constructed at the conversion stage 503. This mapping table is constructed from annotations embedded in the server source files 501. Annotations have the advantage that they do not modify the code logic while they provide a means to give extra information related to the code being annotated. According to the invention, the converter 503 is operable to detect annotations relating to the transformation of APDU headers into RPC procedure calls.

Consider the following example code:

TABLE 7 an example class method with an annotation.

public class Server : MarshalByRefObject
{
  [APDU("A0801234")]
  public void method1( )
  {
    . . .
  }
}

In the code of Table 7, the line "[APDU("A0801234")]" is an annotation. Using this annotation, the converter 503 can determine that the method1 method, i.e., the method having the name method1, corresponds to an APDU header "A0801234".

In an alternative embodiment of the invention, the APDU annotation may have up to four parameters:

The APDUHeader (4 bytes): allows a direct identification
The APDUMask (4 bytes): allows a redirection of a range of APDUHeaders to the method. Example: APDU ("A0801200", mask="000000FF") would represent APDUs in the range from 0xA0801200 and 0xA08012FF (determined using a logical OR operation).
The nominal status word (2 bytes): the status word that should be returned by the system if the method execution ends properly (i.e., do not exit the method via an exception)

The behavior on invalid Le flag: what the system should do when it receives an incorrect GetResponse Length (applies only on outgoing transfer=from card to terminal)–can be:

Reject: card returns 0x6700 status word and data are discarded.

Indicate La: returns 0x6C[La], La being the Length Available–terminal should retransmit the same command with the La value as P3, and card will return the pending data without replay the command.

In alternative embodiments, the server source files 501 may also be annotated with one or two additional annotations, namely, the APDUParam annotation and the APDUException annotation. The APDUParam annotation provides information to the communications layer 703 to replace a parameter value in an RPC call with a corresponding header value. Consider the following example:

TABLE 8

Example of the use of the APDUParam annotation.

[APDU("50401122", statusWord = "6880", OnInvalidLe=Reject)]
Void Foo(int param1, [APDUParam(INS)]int param2)
{
...
}

In the example of Table 8, the APDUParam annotation directs the communications layer 703 to set the content of the second parameter ("param2") to the value of the INS field in the APDU header. The INS field 805 is the second byte of the APDU header. Consequently, in this example, the second parameter will be set to 40.

The APDUException annotation is used along side the [APDU] annotation to notify the communications layer 703 what status word to return upon abnormal execution of a method, i.e., a method exited via an exception. Consider the following example:

TABLE 9

Example of the use of the APDUException annotation

[APDU("50401122", statusWord = "6880", OnInvalidLe=Reject)]
[APDUException(typeof(FileNotFoundException), "8888")]
Void Foo(int param1, [APDUParam(INS)]int param2)
{
...
throw new FileNotFoundException( );
...
}

In the example of Table 9, the APDUException annotation directs the communications layer 703 to return 0x8888 if the method is exited with a FileNotFoundException (conversely, 0x6880 would be the return status upon normal execution).

The execution of the code of Table 9 results in the following execution sequence:

terminal (or host 103) to card 101:
  504011220400000001
in card:
  execution of method Foo( ) with parameters:
    param1=0x00000001
    param2=0x00000040
    throw exception
    exit method
    get information on what to do from the mapping table 517:
    return 0x8888
card 101 to host 103
  0x8888

The annotations are used by the converter 503 to produce a mapping table 517 which maps ADDU headers to RPC method names, provides information on parameter handling, and on exception handling. The mapping table 517 may, for example, have the following structure:

APDUMappingTable:
  number of APDUMapping entries (determined by looking at the number of [APDU0] annotated methods) (1 byte)
  APDUMappingEntry structure list
APDUMappingEntry structure:
  APDU header (4 bytes) (determined from the [APDU] annotation itself)
  APDU mask (4 bytes) (determined from the [ADDU] annotation itself)
  Method Name (2 bytes=encoded name of method)
  Transfer direction (determined from the analysis of the method prototype)=1, 2, 3 or 4 (1 byte)
  Default Status Word (obtained from the [APDU] annotation itself) (2 bytes)
  Behavior on invalid P3 (Le=outgoing transfer only) flag (1 byte) (determined from the [ADDU] annotation itself)
  Number of parameters (determined from the analysis of the method prototype) (1 byte)
  Parameter Attribute list: parameter structure value (n bytes)
  Number of exceptions (1 byte) (determined from the number of [APDUException] annotations)
  Exceptions list: exception structure value (n bytes or empty if none).
Parameter attribute structure value:
  Remap information (1 byte) (determined from the [APDUParam] annotation or 0 if none)
Exception structure value:
  Exception type name (2 bytes) (determined from the [APDUException] annotation)
  Status word to emit when receiving the exception (2 bytes) (determined from the [APDUException] annotation)

Figure 9:
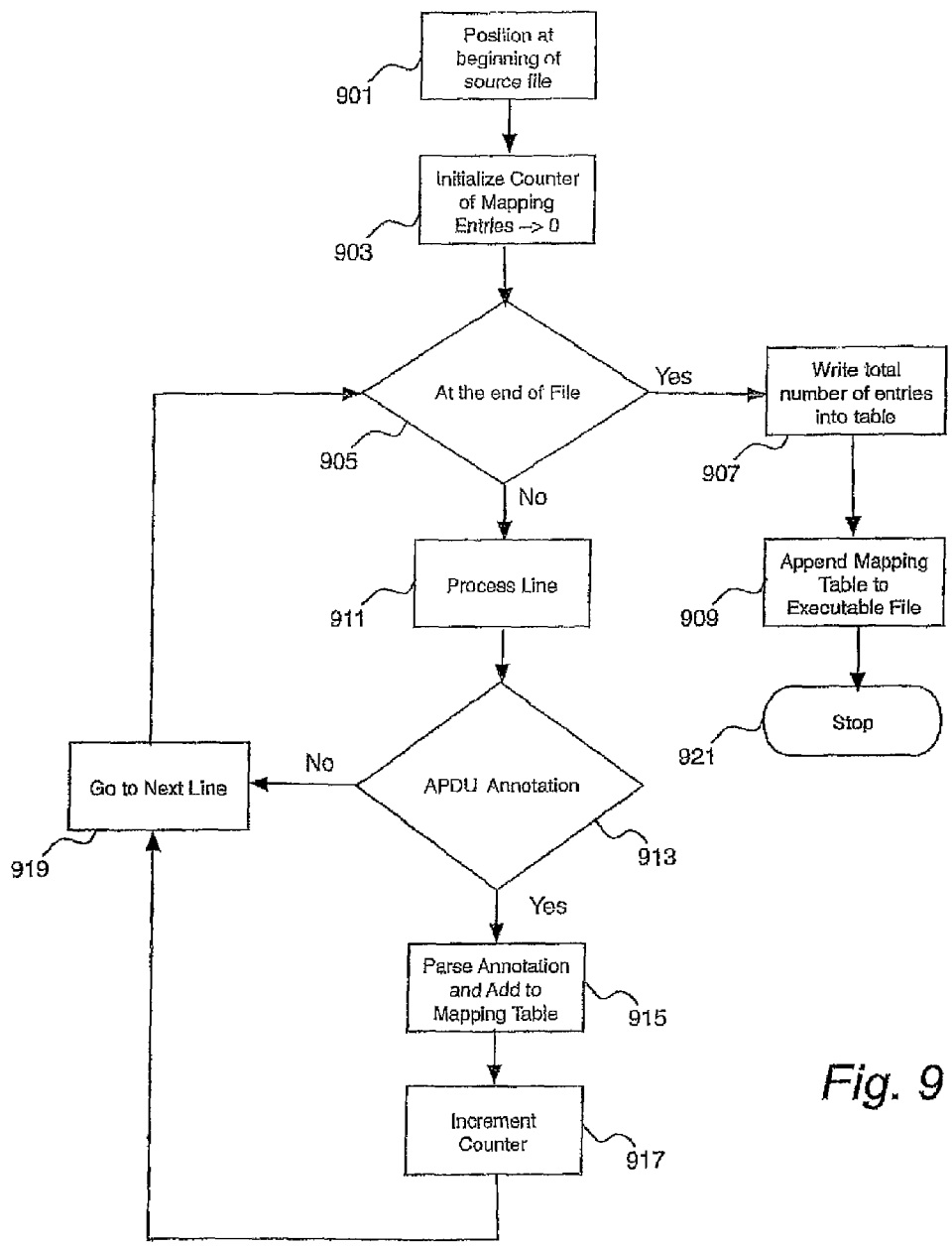
FIG. 9 is a flow-chart illustrating one embodiment of a converter to process a source file to construct a mapping table.

There is a myriad of ways in which a converter 503 may be implemented to perform that function. FIG. 9 is a flow-chart illustrating one embodiment of the converter 503 to process a source file to construct a mapping table.

The processing may be on a line-by-line basis. Therefore, initially the process positions itself to read from the beginning of a source file to be processed, step 901. The mapping table 517 contains an entry with the total number of APDU Mapping Entries to be found in the table. Therefore, a counter is maintained and initialized to 0, step 903.

If not at the end-of-file, step 905, the current line of the program source file is processed, step 911. The converter 503 performs many other processing steps. These steps may be performed in this step 911. If the line contains an APDU annotation, step 913, the annotation is parsed and added to the mapping table 517, step 915, and the counter incremented, step 917. Step 915 is discussed in greater detail herein below in conjunction with FIG. 10.

The processing ends when the end-of-file has been encountered, step 905, in which case the count of APDUEntries may be written to the mapping table 517, step 907, the mapping table is appended to the executable file, step 909, and the process stopped, step 921.

Figure 10:
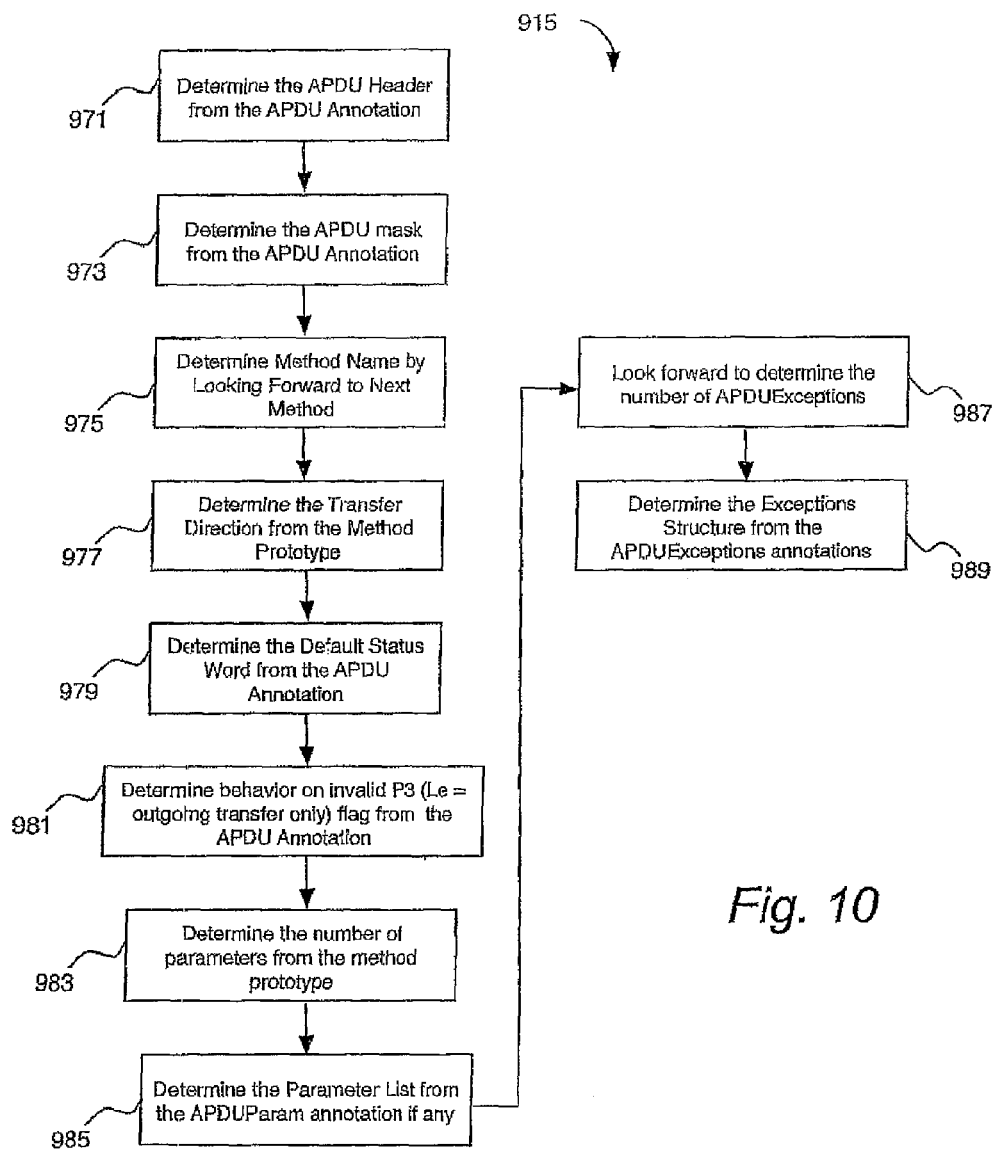
FIG. 10 is a flow-chart illustrating in detail the steps of FIG. 9 of building an APDU mapping entry structure from the APDU annotation, the APDUParam annotation if any, and the APDUExceptions annotation if any.

FIG. 10 is a flow-chart illustrating in detail the step 915 of FIG. 9, i.e., the steps of building an APDU mapping entry structure from the APDU annotation, the APDUParam annotation if any, and the APDUExceptions annotation, if any.

Step 971: The APDU annotation contains the APDU Header and the APDU mask. In the example of Table 9, the APDU annotation is "[APDU("50401122", status-Word="6880", OnInvalidLe=Reject)]". The first four bytes of the mapping table 517 entry would be "50401122".

Step 973: if an APDU mask parameter has been provided, store it into the mapping table. The APDU mask is used by the card to determine if an incoming APDU is within the range [APDU]-[APDU OR APDUMask]).

Step 975: When an APDU annotation has been encountered, the corresponding Method Name must be determined by looking forward to determine the method name. This task may be performed by scanning forward to find the next method name using the rules of the grammar for the high-level language being processed. The method name is then encoded, in this example, as a two byte string.

Step 977: The transfer direction is determined from the method prototype and recorded as one byte. If the method does not receive not return any data, then it is said to be Case1:
void foo (void) { }
If the method only returns data, it is said to be Case2:
byte foo(void) {return 1}
If the method receives data and does not return any data, it said to be Case3:
void foo (byte b){ }
If the method receives and returns data, it is said to be Case 4:
byte foo (byte b) {return b+1}
The Case notation is explained in ISO7816 specification. The transfer direction consists of the value: 1, 2, 3 or 4 indicating which Case applies.

Step 979: The APDU annotation may contain a field called "statusWord". If so, record the value. E.g., in the example of Table 9, the statusWord value to be recorded is 6880. If there is no entry, record a default value. The quantity is recorded as 2 bytes.

Step 981: The APDU annotation may contain a field called "OnInvalidLe". If so, record the value. E.g., in the example of Table 9, the OnInvalidLe value is "reject". If there is no entry, record a default value. The quantity is recorded as 1 byte.

Step 983: Next determine and record the number of parameters. This is determined from the method prototype. For example:
void foo(int i, byte b, ushort [ ] us)
is considered to have 3 parameters (i, b and us), and
void foo(int i, byte b, bool v, string s)
is considered to have 4 parameters (i, b, v and s).

Step 985: Next determine and record the remapping of the parameter list. This remapping is determined from the [APDUParam] annotation. There is one byte entry for each parameter, as determined in step 983. If a parameter is not remapped, the entry is 0.

Step 987: The APDU annotation may be followed by one or more APDUException annotations. In Step 987 the number of APDUException annotations that follow the APDU annotation is determined and recorded.

Step 989: The APDU Exception annotation contains a mapping of exception type and status value to return upon encountering such an exception. Each such mapping will be determined and recorded.

At the conclusion of the conversion steps of FIGS. 9 and 10, the mapping table 517 has been produced and appended to the executable file 401 of the server program.

The converter 503 contains logic operable to perform the process described in conjunction with and illustrated in FIGS. 9 and 10.

Returning now to FIG. 7. FIG. 7 is a block diagram illustrating the components involved in processing an incoming message on the smart card 101. The smart card 101 contains a communications layer 703 for receiving a remote message 701 from a client 403. The remote message 701 may be either in a native communications protocol, e.g., in the preferred embodiment, in the RPC protocol, or it may be in a non-native legacy protocol, e.g., in the preferred embodiment, in the ISO-7816 APDU protocol.

The communications layer 703 consists of a native layer 705 and a legacy layer 707. When the communications layer 703 receives a remote message 701, the communications layer 703 determines, in the decision logic 706, whether the remote message 701 is a legacy protocol message or a native protocol message. If the remote message 701 is a legacy protocol message, the remote message 701 is passed to the legacy layer 707 for translation from the legacy protocol to the native protocol. However, if the remote message 701 is a native protocol message, the remote message 701 is passed directly to the native layer 705 for processing.

If the method is in the native protocol, the message may be passed directly to the run time module 709. The run time module 709 provides a marshalling function that will prepare the method call accordingly to the runtime environment (set-up call instruction, push parameter values onto the stack, etc.)

The message, once prepared accordingly to the runtime environment format, is transmitted to the server executable module 401 for processing.

In the event that the remote message 701 is a legacy protocol message, the legacy layer 707 translates the message into a native protocol message. All valid legacy protocol messages would have been entered into the mapping table 517 generated during the compilation and conversion process that created the executable for the server program. Thus, the legacy layer 707 looks up the entry in the mapping table 517.

The process of building an RPC call from an APDU message is largely the reverse process of the process to build the mapping table 517 of FIGS. 9 and 10.

Figure 11:
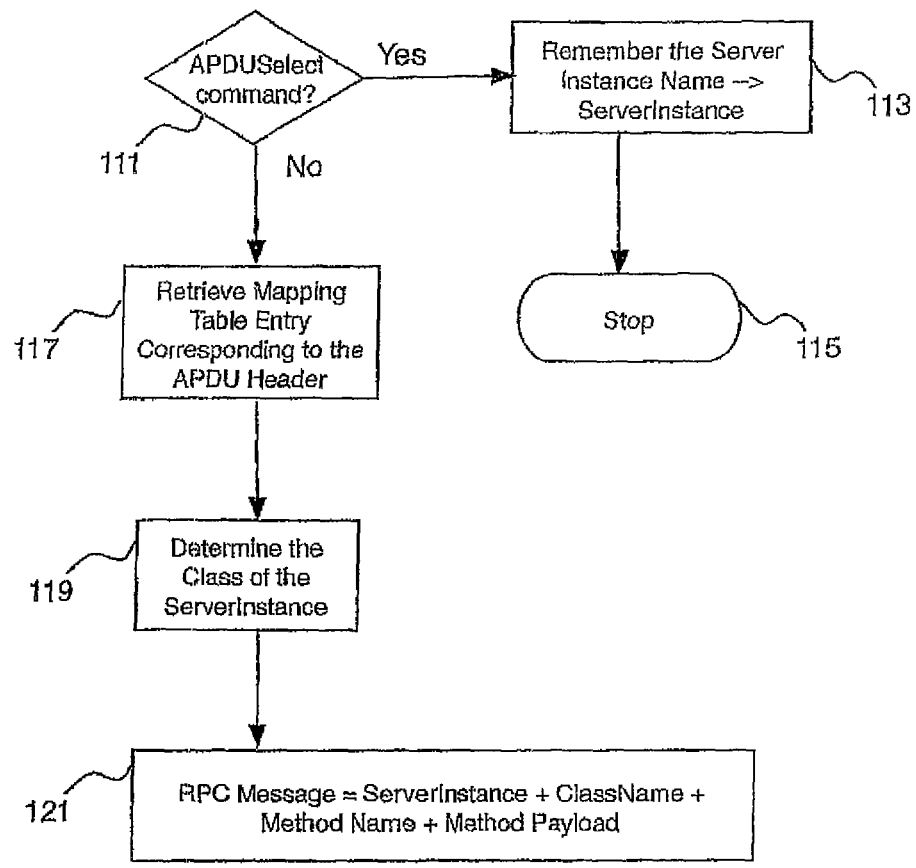
FIG. 11 is a flow-chart illustrating one embodiment of the transformation of an APDU message into an RPC message.

FIG. 11 is a flow-chart illustrating one embodiment of the transformation of an APDU message into an RPC message. As discussed above in a preliminary instruction, in any APDU sequence is the APDUSelect command. If the incoming message is an APDUSelect command, step 111, then the communications layer 703 stores the server instance name specified in the APDUSelect command, step 113. That is all the processing necessary for an APDUSelect command. Thus, the process can stop there, step 115.

If the APDU command is a call to a method of the server 401, the APDU command is translated into an RPC message that can be passed on to the run time layer 709.

First the mapping table 517 entry corresponding to the received APDU header is retrieved from the mapping table 517, step 117. The mapping table entry and the received message 701 contain all the information necessary to produce an RPC method invocation.

Consider again FIG. 6 in which the structure of an RPC method invocation is illustrated. The first item in an RPC method invocation is the Server Reference Name 601. The server reference name 601 was saved in step 113 when processing an APDUSelect command.

Next the RPC method invocation has a Class Name field 603. Accordingly, the class of the server instance is determined, step 119. Since there is a one-to-one relation between the server instance name and the class name when the APDU legacy protocol is used, the Class name is implicitly known by the system via the server instance name (using an internal system lookup).

From these pieces of information the complete RPC method invocation may be built, step 121. It consists of the server instance name, the class name, the method name (which was retrieved from the mapping table in step 117) and the method payload. The method payload is received from the APDU message 701 as fields P3 811 and DATA 813.

At this point, parameters remapping is performed using the information present in the mapping table entry and finally the method is invoked and processed by the server target instance 401.

Once method invocation is done, nominal status word and exception status words or behavior upon invalid ISO7816 GetResponse length can be determined using the remaining information present in the mapping table entry.

Although specific embodiments of the invention have been described and illustrated, the invention is not to be limited to the specific forms or arrangements of parts so described and illustrated. The invention is limited only by the claims.

The invention claimed is:

1. A program development system for developing client and server programs, for a client computer and a server computer, respectively, wherein the client-program is configured to issue method invoking instructions for the server program, the program development system comprising:
   a program development computer programmed to provide support for legacy protocol method invocation, the program development computer programmed to include a converter having instructions to cause the program development computer to construct a server program and a client program wherein the instruction to construct the server program comprises instructions to cause the program development computer to:
   read a source program;
   recognize in the source program annotations that provide a mapping between method names for methods invoked using messages in a legacy protocol and a native protocol;
   create a mapping data structure using the annotations that provide a mapping between method invoking instructions in the legacy protocol and method invoking instructions in the native protocol;
   append the mapping data structure to an executable server program produced by a compiler and the converter;
   include in the executable server program a legacy-protocol-message-to-native-protocol-message transformation mechanism;
   create a client-program-interface for a client;
   wherein the instructions to create a client-program comprises instructions to cause the program development computer to:
   compile a client-program source program against the client-program-interface by including in the compiled client-program instructions;
   include instructions to transmit a select-a-server-program instance message in the client-program; and
   include a legacy-protocol method invocation in the client-program;
   wherein the server computer comprises a mechanism to receive a select-a-server-program-instance message and to save an instance identifier in response thereto;
   wherein the instructions to create a server-program further includes instructions to cause the program development computer to:
   include in the server-program a mechanism to save an instance identifier in response to receiving a select-server-program-instance message;
   wherein the legacy-protocol-message-to-native-protocol-message transformation mechanism comprises instructions to cause the server program to build a native protocol method invocation message using the saved instance identifier and the mapping between method invoking instructions in the legacy protocol and method invoking instructions in the native protocol.

2. The program development system of claim 1 wherein the compiler including instructions to cause computer to ignore the annotations while compiling a source program.

3. The converter of claim 1, wherein the native protocol is a Remote Procedure Call (RPC) method invocation.

4. A smart card programmed to provide support for legacy protocol method invocation, the smart card programmed to include a converter having instructions to cause a processor of the smart card to:
   receive a compiled source program;
   read the compiled source program;
   recognize in the source program annotations that provide a mapping between method names for methods invoked using messages in a legacy protocol and a native protocol;
   create a mapping data structure using the annotations to provide a mapping between method invoking instructions in the legacy protocol and method invoking instructions in the native protocol;
   append the mapping data structure to an executable program produced by a compiler and the converter;
   receive a select-a-server-program-instance message and to save an instance identifier in response thereto; and
   receive a method invocation in the legacy protocol and to build a method invocation in the native protocol using the saved instance identifier and the mapping between method names for methods invoked using messages in a legacy protocol and a native protocol.

5. A system comprising:
   a hardware device programmed to execute instructions of a converter configured to cause the hardware device to produce an executable program from a source program, the converter comprising:
   instructions to cause the hardware device to produce a mapping data structure from annotations embedded in the source program wherein the annotations provide a mapping between method invocations in a legacy protocol and corresponding method names in a native protocol and instructions to append the mapping data structure to an executable program produced by a compiler and the converter;
   a smart card programmed with the instructions directing the smart card to receive a select-a-server-instance message and to save an instance identifier identifying a selected instance in response thereto and to use the instance identifier and the mapping data structure to translate messages received in the legacy protocol into messages in the native protocol.

6. The system of claim 5, wherein the executable program is loaded onto a smart card.

7. The system of claim 5 wherein the native protocol is a Remote Procedure Call (RPC) method invocation.

* * * * *